United States Patent
Kothari et al.

(10) Patent No.: US 9,494,997 B2
(45) Date of Patent: Nov. 15, 2016

(54) HIERARCHICAL CLOCK CONTROL USING HYSTERISIS AND THRESHOLD MANAGEMENT

(71) Applicant: Apple Inc., Cupertino, CA (US)

(72) Inventors: Kulin N. Kothari, Cupertino, CA (US); Pradeep Kanapathipillai, Santa Clara, CA (US); Chetana N. Keltcher, Lexington, MA (US); Pankaj Raghuvanshi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 14/305,514

(22) Filed: Jun. 16, 2014

(65) Prior Publication Data

US 2015/0362978 A1    Dec. 17, 2015

(51) Int. Cl.
G06F 1/32    (2006.01)
G06F 12/00    (2006.01)
G06F 1/10    (2006.01)

(52) U.S. Cl.
CPC .............. *G06F 1/3237* (2013.01); *G06F 1/10* (2013.01); *G06F 1/3225* (2013.01); *G06F 1/3275* (2013.01); *G06F 12/00* (2013.01)

(58) Field of Classification Search
CPC ... G06F 1/3237; G06F 1/3225; G06F 1/3275
See application file for complete search history.

(56) References Cited

U.S. PATENT DOCUMENTS

| | | | | |
|---|---|---|---|---|
| 5,781,783 A | * | 7/1998 | Gunther | G06F 9/3836 700/295 |
| 6,105,141 A | * | 8/2000 | Hanlon | G06F 1/3203 713/323 |
| 6,282,614 B1 | * | 8/2001 | Musoll | G06F 1/3225 711/113 |
| 7,127,560 B2 | | 10/2006 | Cohen et al. | |
| 8,285,936 B2 | | 10/2012 | Roberts et al. | |
| 2012/0173907 A1 | | 7/2012 | Moses et al. | |
| 2013/0227321 A1 | | 8/2013 | Branover et al. | |

* cited by examiner

*Primary Examiner* — Albert Wang
(74) *Attorney, Agent, or Firm* — Meyertons, Hood, Kivlin, Kowert & Goetzel, P.C.; Neal E. Persky; Lawrence J. Merkel

(57) ABSTRACT

In some embodiments, a system may include a sub-hierarchy clock control. In some embodiments, the system may include a master unit. The master unit may include an interface unit electrically coupled to a slave unit. The interface unit may monitor, during use, usage requests of the slave unit by the master unit. In some embodiments, the interface unit may turn off clocks to the slave unit during periods of nonuse. In some embodiments, the interface unit may determine if a predetermined period of time elapses before turning on clocks to the slave unit such that turning off the slave unit resulted in the system achieving greater efficiency. In some embodiments, the interface unit may maintain, during use, power to the slave unit during periods of nonuse. The interface unit may maintain power to the slave unit during periods of nonuse such that data stored in the slave unit is preserved.

18 Claims, 3 Drawing Sheets

HIERARCHICAL CLOCK CONTROL USING HYSTERISIS AND THRESHOLD MANAGEMENT

BACKGROUND

1. Technical Field

Embodiments disclosed herein relate to power management for integrated circuits and related systems. More particularly, some embodiments disclosed herein relate to systems and methods for sub-hierarchy clock control using hysteresis and threshold management.

2. Description of the Related Art

Advances in semiconductor processing and logic design have increased the amount of logic that is included on integrated circuit devices. These increases have resulted in computer systems evolving from multiple integrated circuits in a system to, for example, complete systems on individual integrated circuits. As the density of integrated circuits has grown, the power requirements for computing systems have also increased. As a result, there is a need for energy efficiency and energy conservation associated with integrated circuits. These needs will increase as servers, desktop computers, notebooks, ultrabooks, tablets, mobile phones, processors, embedded systems, etc. become even more prevalent.

As processor technology has advanced and the demand for performance has increased, the number and capacity of cache memories has followed. Some processors may have single level of cache memory and others may have multiple levels of caches. Some cache memories may be used for storing data, instructions, or both. Cache memories for storing other types of information are also used in some processors.

Cache memories may be defined by levels, based on their proximity to execution units of a processor core. For example, a level one (L1) cache may be the closest cache to the execution unit(s), a level two (L2) cache may be the second closest to the execution unit(s), and a level three (L3) cache may be the third closest to the execution unit(s), etc. When accessing information for an instruction to be executed, an execution unit may first query the level one cache. If the information is not stored in the level one cache (i.e., a cache miss), the level two cache may be queried, and so forth. If the information is not stored in any cache, the information may be accessed from other storage such as main memory or from disk storage. Since the latency associated with memory and disk storage accesses is much greater than the latency associated with cache accesses, cache memories have become larger to accommodate more data and/or instructions. However, these larger cache memories may consume more power than their smaller counterparts. As such, some processors may remove power to part or all of a cache memory when the processor is idle.

SUMMARY

Embodiments described herein are directed towards a powerdown mechanism. The powerdown mechanism may shut off the clock of a lower level hierarchy. In some embodiments, the powerdown mechanism may base the shut off decision on by looking at the past history of events in the hierarchy and dynamically adjusting a threshold(s) before which the clocks can be turned off. In some embodiments, the adjustment of these thresholds and how the history bits are interpreted can be programmed to select various performance/power trade-off operating points.

In some embodiments, a system may include a sub-hierarchy clock control. In some embodiments, the system may include a master unit. The master unit may include an interface unit electrically coupled to a slave unit. The interface unit may monitor, during use, usage requests of the slave unit by the master unit. In some embodiments, the interface unit may turn off clocks to the slave unit during periods of nonuse. In some embodiments, the interface unit may determine if a predetermined period of time elapses before turning on clocks to the slave unit such that turning off the slave unit resulted in the system achieving greater efficiency. In some embodiments, the interface unit may maintain, during use, power to the slave unit during periods of nonuse. The interface unit may maintain power to the slave unit during periods of nonuse such that data stored in the slave unit is preserved.

BRIEF DESCRIPTION OF THE DRAWINGS

The following detailed description makes reference to the accompanying drawings, which are now briefly described.

Figure 1:
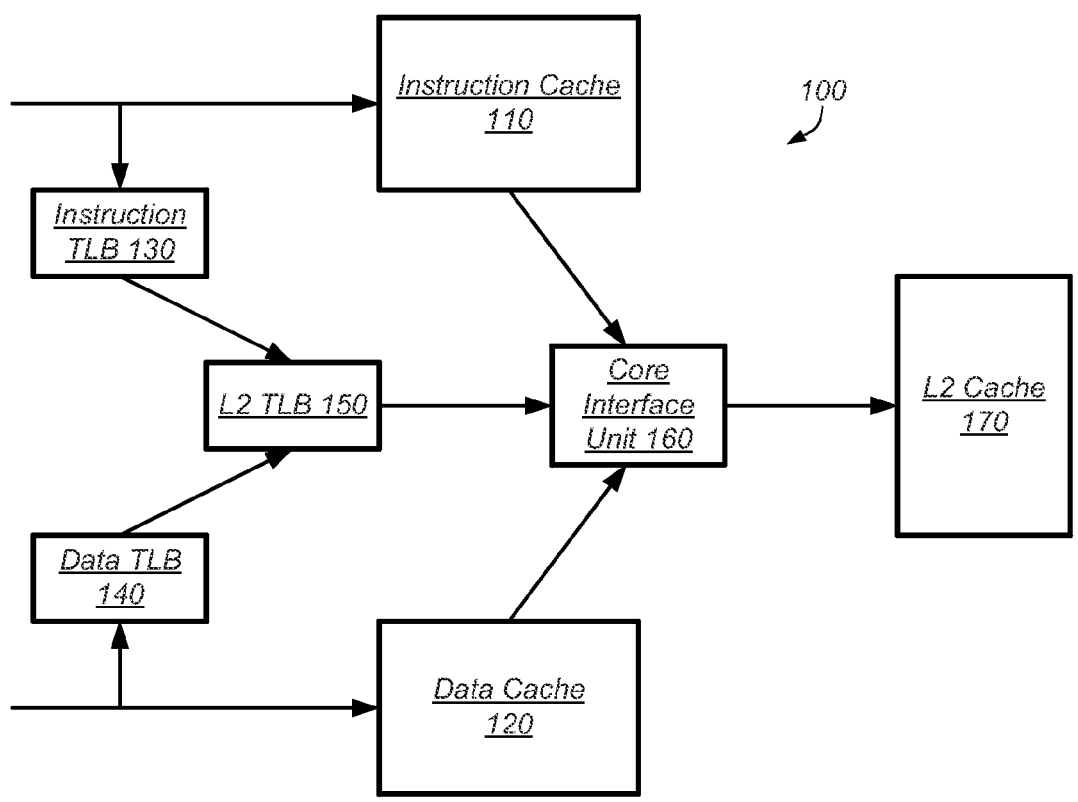
FIG. 1 depicts an embodiment of a representation of a general 2-level cache hierarchy subsystem.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that"

performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In some embodiments, a system may include a general 2-level cache hierarchy subsystem. FIG. 1 depicts an embodiment of a representation of a general 2-level cache hierarchy subsystem 100. Instruction fetches that miss the instruction cache 110 and data requests that miss the data cache 120 are sent through the core interface unit 160 to the second level cache 170. Similarly translation (e.g., instruction translation lookaside buffer (TLB) 130 or data TLB 140) misses that miss the second level translation lookaside buffer (e.g., L2 TLB 150) are sent through the core interface unit 160 to the L2 cache 170. To support reduced latency for data returning from the second level cache, the first miss request may be bypassed to the L2 cache 170. Because of this requirement, some implementations of the system may keep the second level cache speculatively ON for any instruction or data fetch requests. Even when there are no actual misses, second level cache may remain ON as long as there is a request in the machine. This may result in significant wasted power when there are no misses and embodiments described below may reduce the wasted power.

Figure 2:
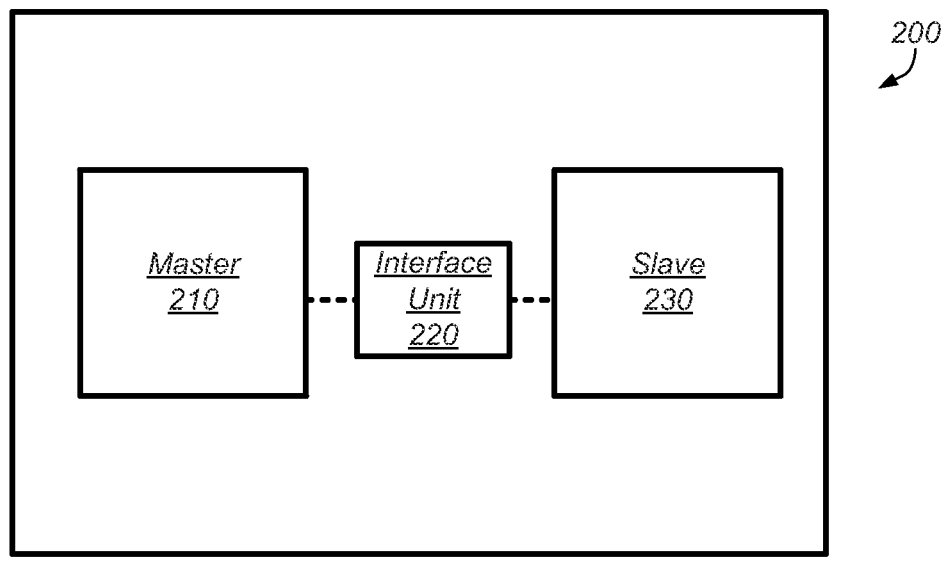
FIG. 2 depicts an embodiment of a system including a master and slave unit.
Figure 3:
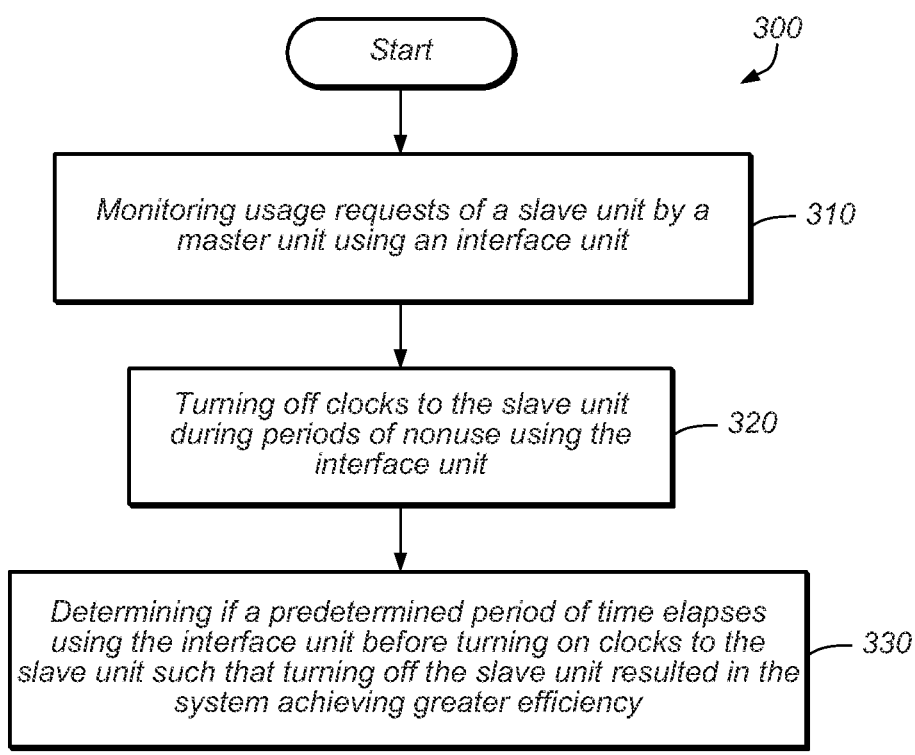
FIG. 3 depicts an embodiment of a method for controlling hierarchical clocks using hysteresis and threshold management.

FIG. 2 depicts an embodiment of a system including a master and slave unit. In some embodiments, a system 200 may include a sub-hierarchy clock control. In some embodiments, the system 200 may include a master unit 210. The master unit may include an interface unit 220 electrically coupled to a slave unit 230. FIG. 3 depicts an embodiment of a method 300 for controlling hierarchical clocks using hysteresis and threshold management. The interface unit 220 may be configured to monitor, during use, usage requests of the slave unit 230 by the master unit 210 (310). In some embodiments, the interface unit 230 may be configured to turn off clocks to the slave unit during periods of nonuse (320). Turning off the clocks may also be referred to as clock gating. In some embodiments, the interface unit 220 may be configured to determine if a predetermined period of time elapses before turning on clocks to the slave unit 230 such that turning off the slave unit resulted in the system achieving greater efficiency (330).

In some embodiments, the interface unit 220 may be configured to turn off the clock of a lower level slave unit (e.g., a level 2 cache) based on the past history of events and dynamically adjusting the thresholds before which the clocks can be turned off. The adjustment of these thresholds and how the history bits are interpreted may be programmed to select various performance/power trade-off operating points.

In some embodiments, the interface unit 220 may be configured to maintain, during use, power to the slave unit during periods of nonuse. The interface unit 220 may maintain power to the slave unit during periods of nonuse such that data stored in the slave unit is preserved. In some embodiments, the interface unit 220 may be configured to adjust, during use, the predetermined period of time such that the system achieves greater efficiency.

In some embodiments, the master unit 210 and the slave unit 230 may represent different portions of the architecture of an electronic circuit (e.g. as depicted in FIG. 1). For example, the slave unit 230 may include a cache in some embodiments.

In some embodiments, the interface unit 220 may include a first counter. The first counter may count, during use, each successful usage request of the master unit 210. When the first counter reaches a first threshold, indicating that the slave unit 230 has not been used for a period of time, the interface unit 220 may turn off clock(s) to the slave unit 230. If the interface unit does detect an unsuccessful usage request of the master unit 210 before the first counter reaches the first threshold the first counter may be reset (e.g., to 0) and the process may then repeat (i.e., the first counter renews counting each successful usage request of the master unit 210).

In some embodiments, the interface unit may include a second counter. When the interface unit 220 turns off clocks to the slave unit 230 the second counter may be activated. In some embodiments, when the interface unit 220 turns off clocks to the slave unit 230 the first counter may suspend activity. Upon activation the second counter may count, during use, each successful usage request of the master unit 210. If the interface unit 220 does not detect, during use, an unsuccessful usage request before the second counter reaches a second threshold the interface unit 220 may determine that a successful event has occurred. Upon determining that a successful event has occurred the interface unit 220 registers the successful event. In some embodiments, the second threshold is less than the first threshold. In some embodiments, initially, the two thresholds are programmed at the lowest value.

If the interface unit 220 does detect, during use, an unsuccessful usage request before the second counter reaches a second threshold the interface unit determines that an unsuccessful event has occurred. Upon determining that an unsuccessful event has occurred the interface unit registers the unsuccessful event.

In some embodiments, if the interface unit 220 registers fewer unsuccessful events than a tolerance count and if the second counter is greater than the second threshold then the interface unit decreases the first threshold and second threshold. In some embodiments, if the interface unit 220 registers more unsuccessful events than a tolerance count and if the second counter is less than the second threshold then the interface unit increases the first threshold and second threshold. In some embodiments, the tolerance count will be programmed with a fixed value depending on the tolerance threshold required.

Figure 4:
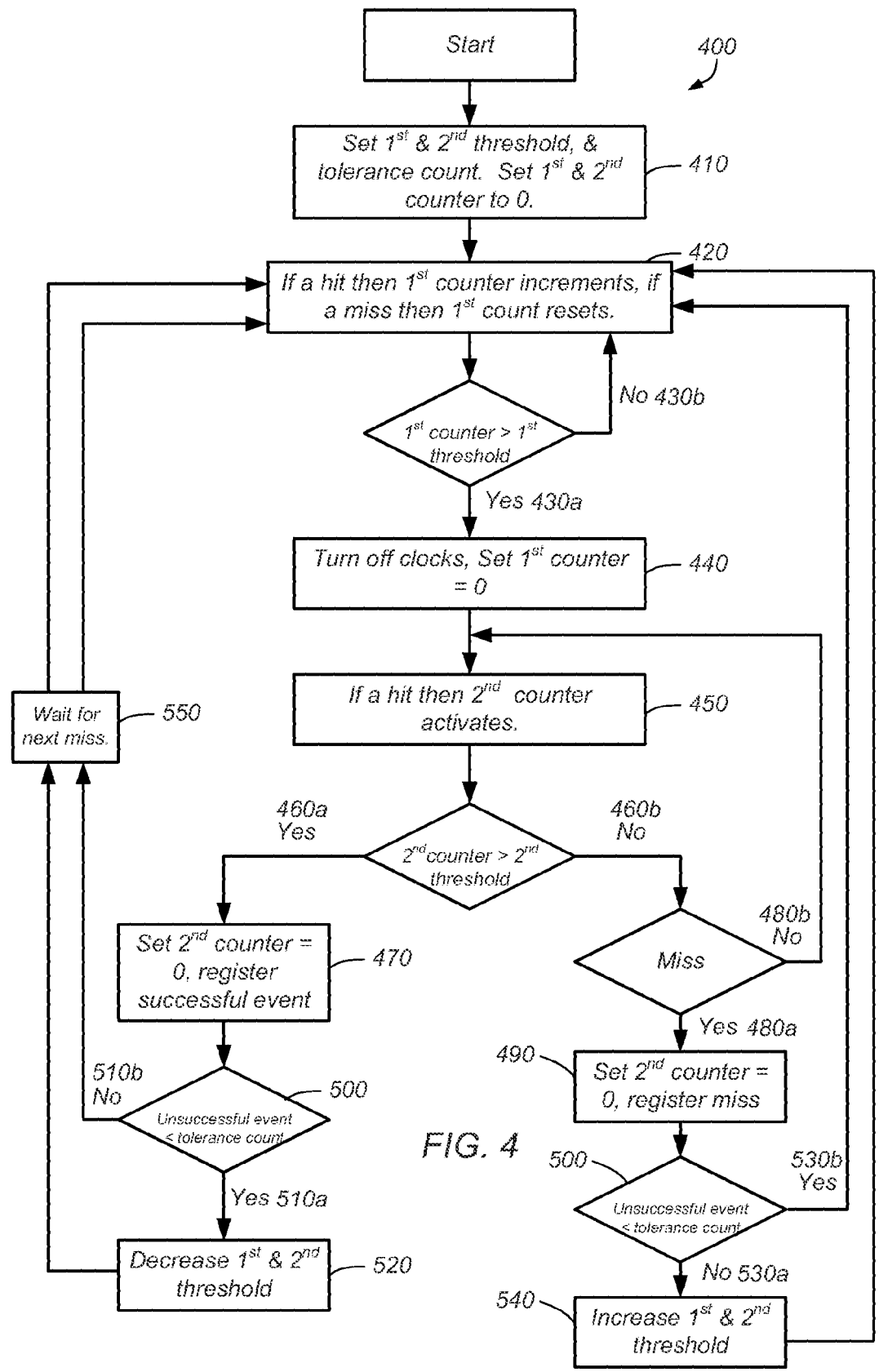
FIG. 4 depicts an embodiment of a representation of a logic system for controlling hierarchical clocks using hysteresis and threshold management.

FIG. 4 depicts an example of an embodiment of a representation of a logic system 400 for controlling hierarchical clocks in the cache hierarchy illustrated in FIG. 1 using hysteresis and threshold management as discussed herein. Initially first and second thresholds and a tolerance count are set 410 (e.g., first and second thresholds may be set to 0). As memory ops are issued, a first counter may be incremented 420 every issue cycle if the op hits in the master unit (e.g., the L1 caches 110 and 120, or the TLBs 130, 140, and 150). If there is no miss 430a before the first counter reaches the first threshold, the L2 cache has not been accessed for a period of time and the clocks may be turned off 440. If we get a master unit miss before the counter reaches the first threshold, the first counter is reset to 0 and the process repeats.

Once the slave unit clock turn off is initiated, the first counter may be frozen and a second counter may be activated 450. This counter may be incremented each cycle for every master unit hit. If there is no miss before the second counter reaches the second threshold (e.g., the shorter threshold) 460a, it indicates that a reasonable amount of cycles have occurred where the slave unit clocks have been turned off and there was no access to the slave unit. This may be marked as a successful clock turn off event 470 (e.g., by shifting a 0 into the history shift register). If a miss occurs before the second counter reaches threshold 460b, the op may be replayed because the slave unit clocks are turned off. If another miss occurs 480a a performance penalty occurs. This incurs a performance penalty and this is marked as an unsuccessful event 490 (e.g., by shifting a 1 into a history shift register) and the second counter may be reset to 0. If another miss does not occur 480b the second counter continues counting.

After the shift register has been updated, the number of unsuccessful events (e.g., 1 s) in the shift register is compared to the tolerance count 500. If the number of unsuccessful events is greater than the tolerance count, this may be an indication that the past history of slave unit clock turn off events has been followed by a master unit miss in a short interval. Depending on whether or not the second counter was greater than the second threshold, the values of both the thresholds may be updated using the following TABLE I.

TABLE I

| Row | Premature wakeup $2^{nd}$ counter <$2^{nd}$ threshold | # unsuccessful events < tolerance count | Action |
|---|---|---|---|
| 1 | No | No | No change in thresholds |
| 2 | No | Yes | Decrease thresholds. |
| 3 | Yes | No | Increase thresholds |
| 4 | Yes | Yes | No change in thresholds |

For example, row (1) of TABLE I indicates that a successful clock turn off event occurred, but the overall history has had unsuccessful events that are more than the tolerance count, so the thresholds are unchanged.

Row (2) of TABLE I indicates that a successful clock turn off event occurred, and the overall history has had unsuccessful events that are less than the tolerance count 510a, so the thresholds are decreased 520. This is an indication that a lot of performance penalty are not being incurred and slave unit accesses are not occurring in short intervals after the power down. If a successful power down event occurred, and the overall history has had unsuccessful events that are more than the tolerance count 510b, then the system waits for a miss 550 and restarts at 420.

Row (3) of TABLE I indicates that an unsuccessful clock turn off event occurred, and the overall history has had unsuccessful events that are more than the tolerance count 530a, so the thresholds are increased 540. This is an indication that to many performance penalties are being incurred and slave unit accesses are occurring in relatively short intervals after the power down. The increase may cause an increase in a number of consecutive master unit hits before slave unit clocks can be turned OFF. The concept is that if a lot of these events are happening, then the thresholds should be eventually raised to their maximum value to minimize performance loss. If an unsuccessful power down event occurred, and the overall history has had unsuccessful events that are less than the tolerance count 530b, then the system restarts at 420.

Row (4) of TABLE I indicates that an unsuccessful clock turn off event occurred, but the overall history has had unsuccessful events that are less than the tolerance count, so the thresholds are unchanged.

In some embodiments, a similar mechanism using different thresholds may be used to monitor integrated circuit (IC) and/or memory management unit (MMU) requests.

Numerous variations and modifications will become apparent to those skilled in the art once the above disclosure is fully appreciated. It is intended that the following claims be interpreted to embrace all such variations and modifications.

What is claimed is:

1. A system comprising sub-hierarchy clock control, comprising:
a master unit including an interface unit electrically coupled to a slave unit, wherein the interface unit monitors, during use, usage requests of the slave unit by the master unit and turns off clocks to the slave unit during periods of nonuse based on a past history, and wherein the interface unit adjusts, during use, thresholds before which the clocks can be turned off; and
wherein the interface unit determines if a predetermined period of time elapses before turning on clocks to the slave unit; and
wherein the interface unit adjusts, during use, the predetermined period of time.

2. The system of claim 1, wherein the interface unit maintains, during use, power to the slave unit during periods of nonuse.

3. The system of claim 1, wherein the interface unit maintains, during use, power to the slave unit during periods of nonuse such that data stored in the slave unit is preserved.

4. The system of claim 1, wherein the slave unit comprises a cache.

5. The system of claim 1, wherein the interface unit comprises a first counter which counts, during use, each successful usage request of the master unit up to at least a first threshold.

6. The system of claim 5, wherein when the first counter reaches the first threshold the interface unit turns off clocks to the slave unit if the interface unit does not monitor an unsuccessful usage request before the first counter reaches the first threshold.

7. The system of claim 5, wherein if the interface unit monitors, during use, an unsuccessful usage request before the first counter reaches the first threshold then the first counter is reset to zero.

8. The system of claim 5, wherein if the interface unit monitors, during use, an unsuccessful usage request before the first counter reaches the first threshold then the first counter is reset to zero and then the first counter continues counting successful usage requests of the master unit.

9. The system of claim 6, wherein when the interface unit turns off clocks to the slave unit a second counter is activated to count, during use, each successful usage request of the master unit.

10. The system of claim 9, wherein if the interface unit does not monitor, during use, an unsuccessful usage request before the second counter reaches a second threshold the interface unit determines that a successful event has occurred and the interface unit registers the successful event, and wherein the second threshold is less than the first threshold.

11. The system of claim 9, wherein if the interface unit does monitor, during use, an unsuccessful usage request before the second counter reaches a second threshold the interface unit determines that an unsuccessful event has occurred and the interface unit registers the unsuccessful event, and wherein the second threshold is less than the first threshold.

12. The system of claim 11, wherein if the interface unit registers fewer unsuccessful events than a tolerance count and if the second counter is greater than the second threshold then the interface unit decreases the first threshold and second threshold.

13. The system of claim 11, wherein if the interface unit registers more unsuccessful events than a tolerance count and if the second counter is less than the second threshold then the interface unit increases the first threshold and second threshold.

14. A method of controlling hierarchical clocks, comprising:
monitoring usage requests of a master unit using an interface unit, wherein the master unit comprises the interface unit electrically coupled to a slave unit;
turning off clocks to the slave unit during periods of nonuse using the interface unit based on a past history by adjusting thresholds before which the clocks can be turned off using the interface unit;
determining if a predetermined period of time elapses using the interface unit before turning on clocks to the slave unit; and
adjusting the predetermined period of time using the interface unit.

15. The method of claim 14, further comprising:
maintaining power to the slave unit during periods of nonuse using the interface unit; and
preserving data stored in the slave unit.

16. The method of claim 14, further comprising:
activating a second counter to count each successful usage request of the master unit when the interface unit turns off clocks to the slave unit;
determining that an unsuccessful event has occurred and registering the unsuccessful event using the interface unit if the interface unit does monitor, during use, an unsuccessful usage request before the second counter reaches a second threshold, wherein the second threshold is less than a first threshold.

17. The method of claim 16, further comprising decreasing the first threshold and the second threshold using the interface unit if the interface unit registers fewer unsuccessful events than a tolerance count and if the second counter is greater than the second threshold.

18. The method of claim 16, further comprising increasing the first threshold and the second threshold using the interface unit if the interface unit registers more unsuccessful events than a tolerance count and if the second counter is less than the second threshold.

* * * * *